(12) United States Patent
Cheng et al.

(10) Patent No.: US 12,512,969 B2
(45) Date of Patent: Dec. 30, 2025

(54) METHODS FOR MANAGING HARDWARE SECURITY SERVERS AND DEVICES THEREOF

(71) Applicant: F5, Inc., Seattle, WA (US)

(72) Inventors: Liang Cheng, Seattle, WA (US); Saxon C. Amdahl, Seattle, WA (US)

(73) Assignee: F5, Inc., Seattle, WA (US)

( * ) Notice: Subject to any disclaimer, the term of this patent is extended or adjusted under 35 U.S.C. 154(b) by 453 days.

(21) Appl. No.: 18/087,926

(22) Filed: Dec. 23, 2022

(65) Prior Publication Data

US 2024/0214181 A1 Jun. 27, 2024

(51) Int. Cl.
*H04L 9/08* (2006.01)
*H04L 67/1006* (2022.01)
*H04L 67/1014* (2022.01)

(52) U.S. Cl.
CPC .......... *H04L 9/0825* (2013.01); *H04L 9/0866* (2013.01); *H04L 9/0894* (2013.01); *H04L 67/1006* (2013.01); *H04L 67/1014* (2013.01)

(58) Field of Classification Search
CPC .... H04L 9/0825; H04L 9/0866; H04L 9/0894
See application file for complete search history.

(56) References Cited

U.S. PATENT DOCUMENTS

| | | | | |
|---|---|---|---|---|
| 8,566,932 B1 * | 10/2013 | Hotta | .................... | G06F 21/567 726/22 |
| 8,584,247 B1 * | 11/2013 | Patil | ..................... | G06Q 10/101 726/4 |
| 8,868,726 B1 * | 10/2014 | Tu | ....................... | G06F 11/1461 709/224 |
| 10,075,439 B1 * | 9/2018 | Mullens | ................ | H04L 63/126 |

(Continued)

FOREIGN PATENT DOCUMENTS

| | | |
|---|---|---|
| CN | 106603516 A | 4/2017 |
| CN | 111935289 A | 11/2020 |
| EP | 3780485 A1 | 2/2021 |
| FR | 2945644 A1 | 11/2010 |
| WO | 2019212773 A1 | 11/2019 |

OTHER PUBLICATIONS

International Search Report dated Feb. 29, 2024 issued in International Application No. PCT/US2023/083100.

(Continued)

*Primary Examiner* — Vivek Srivastava
*Assistant Examiner* — Wuji Chen
(74) *Attorney, Agent, or Firm* — Troutman Pepper Locke LLP (57) ABSTRACT

Methods, non-transitory computer readable media, network traffic manager apparatuses, and systems that assist with managing hardware security servers includes receiving a request from a client. The request can comprise of a unique numerical handle and a command for a hardware security server. The unique numerical handle can be generated as a response to a previous request from the client. It can further include searching for a key handle mapped to the unique numerical handle and hardware security server in memory. The method can also include sending the request to the hardware security server with the key handle when the key handle is retrieved from memory during the search and sending a response received from the hardware security server to the client. The response can be received as a result of sending the request to the hardware security server.

20 Claims, 5 Drawing Sheets

(56) References Cited

U.S. PATENT DOCUMENTS

| | | | |
|---|---|---|---|
| 11,095,638 B2* | 8/2021 | Rossi | H04L 9/3228 |
| 11,256,553 B2* | 2/2022 | Janakiraman | H04L 67/1008 |
| 11,575,508 B2* | 2/2023 | Anand | H04L 9/083 |
| 2001/0037358 A1 | 11/2001 | Clubb et al. | |
| 2002/0013897 A1* | 1/2002 | McTernan | H04L 69/165 |
| | | | 713/153 |
| 2007/0297610 A1* | 12/2007 | Chen | H04L 9/083 |
| | | | 380/270 |
| 2011/0053614 A1* | 3/2011 | Mishina | G01S 5/0009 |
| | | | 342/451 |
| 2011/0131413 A1* | 6/2011 | Moon | H04N 7/1675 |
| | | | 713/168 |
| 2011/0173303 A1 | 7/2011 | Rider | |
| 2011/0258434 A1* | 10/2011 | Qiu | H04L 9/0891 |
| | | | 713/153 |
| 2012/0011360 A1* | 1/2012 | Engels | H04L 9/006 |
| | | | 380/278 |
| 2012/0124373 A1* | 5/2012 | Dangoor | H04W 12/50 |
| | | | 713/168 |
| 2015/0131796 A1* | 5/2015 | Milsted | G06K 19/06112 |
| | | | 380/44 |
| 2017/0005995 A1* | 1/2017 | Yang | H04L 9/321 |
| 2018/0034643 A1* | 2/2018 | Yang | H04L 63/166 |
| 2018/0124078 A1* | 5/2018 | Hajmasan | H04L 63/1408 |
| 2018/0357426 A1* | 12/2018 | Pearson | G06F 21/6254 |
| 2019/0028269 A1* | 1/2019 | Lu | H04L 9/0822 |
| 2019/0132127 A1* | 5/2019 | Birke | H04L 9/0869 |
| 2019/0182240 A1* | 6/2019 | Rossi | H04W 12/42 |
| 2019/0305951 A1* | 10/2019 | Grubin | H04L 9/30 |
| 2019/0386993 A1* | 12/2019 | Lu | H04L 63/0884 |
| 2020/0100108 A1* | 3/2020 | Everson | H04W 12/041 |
| 2020/0162580 A1 | 5/2020 | Suresh | |
| 2021/0051002 A1* | 2/2021 | Cheng | H04L 9/0819 |
| 2021/0051025 A1* | 2/2021 | Li | H04L 9/3239 |
| 2021/0279112 A1* | 9/2021 | Janakiraman | G06F 9/5083 |
| 2022/0417276 A1* | 12/2022 | Okutani | H04L 63/1433 |
| 2024/0144232 A1* | 5/2024 | White | G06Q 20/327 |

OTHER PUBLICATIONS

International Search Report dated Feb. 20, 2024 issued in International Application No. PCT/US2023/083097.

Office Action dated Jun. 12, 2024 issued in Taiwanese Application No. 112149276.

International Preliminary Report on Patentability for PCT/US2023/083097, dated Jun. 24, 2025.

* cited by examiner

METHODS FOR MANAGING HARDWARE SECURITY SERVERS AND DEVICES THEREOF

FIELD

This technology relates to methods and systems for managing hardware security servers.

BACKGROUND

The proposed technology relates to a hardware security server proxy. A hardware security server proxy can provide a single interface to a user on the front-end, while implementing a number of implementations to a plurality of hardware security server(s) on the back-end. The problem with hardware security servers is that different vendors or providers have hardware security servers with different capabilities and application programming interfaces (APIs) that can require the installation of a custom library for each hardware security server.

SUMMARY

A method for establishing a connection to a server with a certificate, implemented in cooperation with a cloud service or a network traffic management system comprising one or more network traffic management modules, server modules, or client modules, includes receiving a request from a client. The request can comprise of a unique numerical handle and a command for a hardware security server. The unique numerical handle can be generated as a response to a previous request from the client. It can further include searching for a key handle mapped to the unique numerical handle and hardware security server in memory. The method can also include sending the request to the hardware security server with the key handle when the key handle is retrieved from memory during the search and sending a response received from the hardware security server to the client. The response can be received as a result of sending the request to the hardware security server.

A network traffic management apparatus including memory including programmed instructions stored thereon and one or more processors configured to be capable of executing the stored programmed instructions to receive a request from a client. The request can comprise of a unique numerical handle and a command for a hardware security server. The unique numerical handle can be generated as a response to a previous request from the client. Next, the network traffic manager apparatus searches for a key handle mapped to the unique numerical handle and hardware security server in memory. Next, the network traffic manager apparatus sends the request to the hardware security server with the key handle when the key handle is retrieved from memory during the search and sending a response received from the hardware security server to the client. The response can be received as a result of sending the request to the hardware security server.

A non-transitory computer readable medium having stored thereon instructions for including executable code that, when executed by one or more processors, causes the processors to receive a request from a client. The request can comprise of a unique numerical handle and a command for a hardware security server. The unique numerical handle can be generated as a response to a previous request from the client. Next, the network traffic manager apparatus searches for a key handle mapped to the unique numerical handle and hardware security server in memory. Next, the network traffic manager apparatus sends the request to the hardware security server with the key handle when the key handle is retrieved from memory during the search and sending a response received from the hardware security server to the client. The response can be received as a result of sending the request to the hardware security server.

A network traffic management system includes one or more traffic management modules, server modules, or client modules, memory comprising programmed instructions stored thereon, and one or more processors configured to be capable of executing the stored programmed instructions to receive a request from a client. The request can comprise of a unique numerical handle and a command for a hardware security server. The unique numerical handle can be generated as a response to a previous request from the client. Next, the network traffic manager apparatus searches for a key handle mapped to the unique numerical handle and hardware security server in memory. Next, the network traffic manager apparatus sends the request to the hardware security server with the key handle when the key handle is retrieved from memory during the search and sending a response received from the hardware security server to the client. The response can be received as a result of sending the request to the hardware security server.

This technology provides a number of advantages including providing methods, non-transitory computer readable media, network traffic management apparatuses, and network traffic management systems that connects a proxy library to client devices on the front-end and uses virtual key tables to map to different back-end keys for the plurality of hardware security servers. This technology creates a method to increase efficiency for managing hardware security servers.

DETAILED DESCRIPTION

The proposed technology relates to managing hardware security servers by using a network traffic manager apparatus as a hardware security server proxy which connects a proxy library to client devices on the front-end, while the proxy uses virtual key tables to map to different back-end keys for the plurality of hardware security servers. The proposed technology can also connect to the plurality of hardware security servers simultaneously and can instantly switch to any one of the plurality of hardware security servers for a requested key operation.

The hardware security server proxy can use an endpoint with a united RESTful interface connecting the hardware security server proxy to the client device. In some examples, the network traffic manager apparatus can automatically update software on the client devices as required when the plurality of hardware security servers update their respective software. This is accomplished by sending an update to the client devices after a hardware security server updates its software. This allows a user to avoid re-configuring or restarting their infrastructure every time one of the plurality of hardware security servers update their software.

Figure 1:
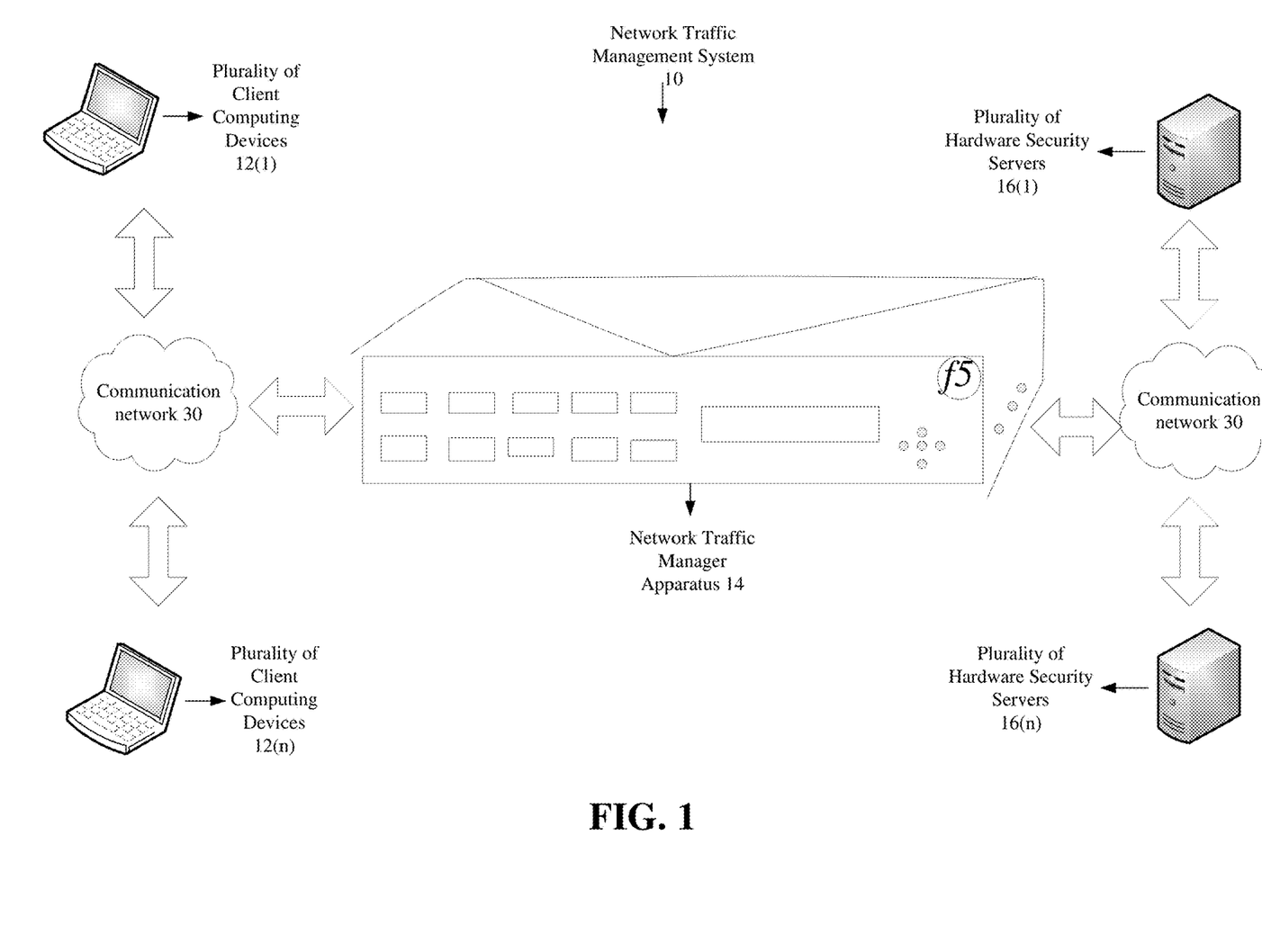
FIG. 1 is block diagrams of an exemplary network traffic management system with a network traffic management apparatus.
Figure 2:
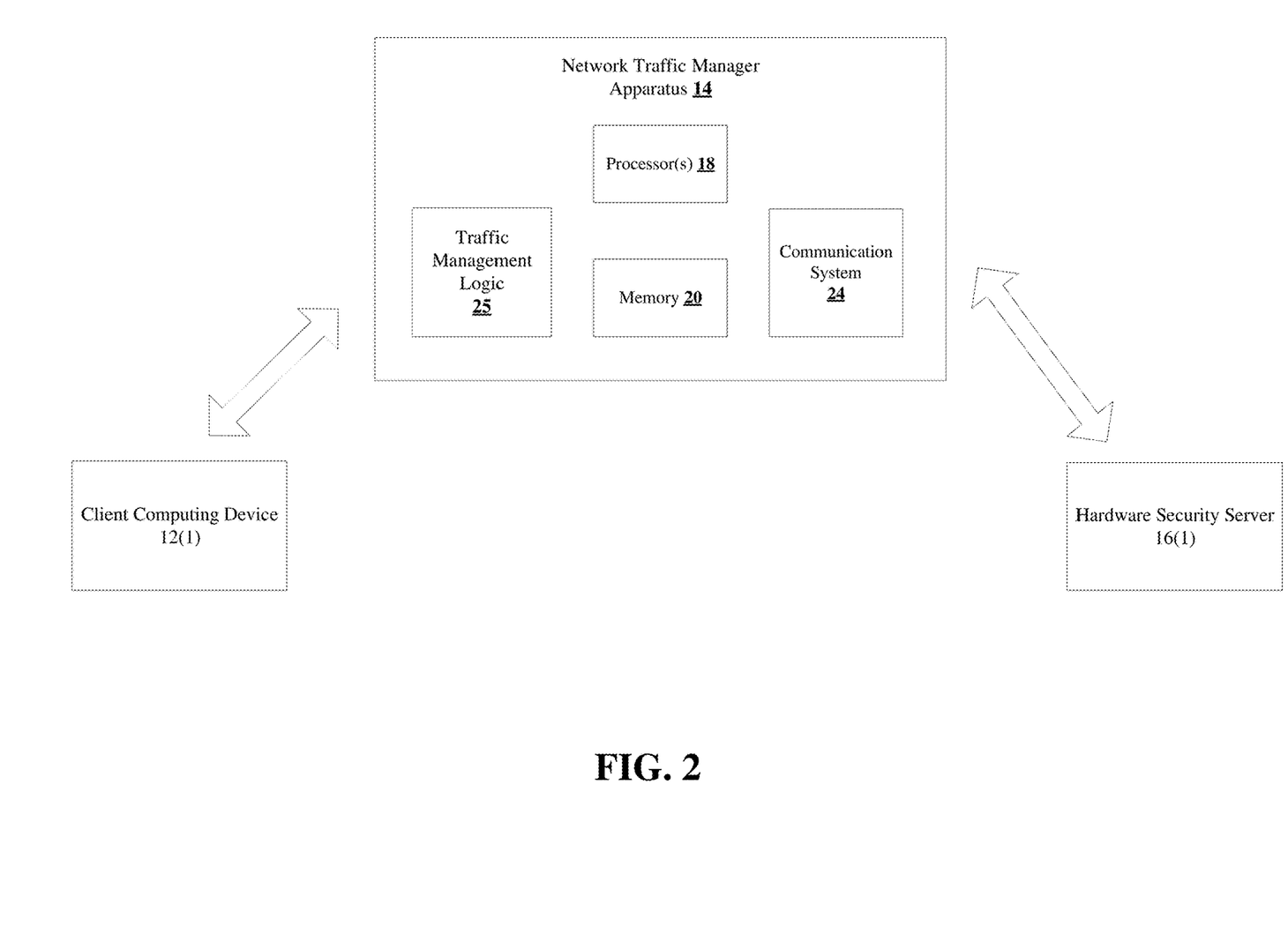
FIG. 2 is block diagrams of an exemplary network traffic management apparatus communicating with a client computing device and a hardware security server.

An example of the proposed technology includes a network environment 10 which incorporates a network traffic management system for providing a network traffic manager apparatus 14 with a network traffic manager apparatus 14 is illustrated in FIGS. 1 and 2. The exemplary environment 10 includes a plurality of client computing devices 12(1)-12(n), a network traffic manager apparatus 14, the network traffic manager apparatus 14, and the plurality of hardware security server(s) 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here.

Referring more specifically to FIG. 1, the network traffic manager apparatus 14 of the network traffic management system is coupled to the plurality of client computing devices 12(1)-12(n) through the communication network 30, although the plurality of client computing devices 12(1)-12(n) and network traffic manager apparatus 14 may be coupled together via other topologies. Additionally, the network traffic manager apparatus 14 is coupled to the network traffic manager apparatus 14 through the communication network 30, although the network traffic manager apparatus 14 and the network traffic manager apparatus 14 may be coupled together via other topologies.

As illustrated in FIG. 2, the network traffic manager apparatus 14 includes processor or central processing unit (CPU) 18, memory 20, optional configurable hardware logic 21, and a communication system 24 which are coupled together by a bus device 26 although the network traffic manager apparatus 14 may comprise other types and numbers of elements in other configurations. In this example, the bus is a PCI Express bus in this example, although other bus types and links may be used. The network traffic manager apparatus 14 can include a communication system 24 used to convey information, such as computer-executable instructions or other data. As a specific example with reference to FIG. 2, a communication system 24 of the network traffic management apparatus 14 operatively couples to and communicates with the communication network 30 so that the network traffic management apparatus 14 is coupled to and can communicate with the client computing devices 12(1)-12(n) and the plurality of hardware security servers 16(1)-16(n). The traffic management logic 25 of the network traffic manager 14 can perform various proxy services, such as load balancing, rate monitoring, caching, encryption/decryption, session management (including key generation), address translation, and/or access control, for example. As illustrated in FIG. 2, the network traffic manager apparatus 14 can send and receives requests, responses or other proxy service operations to and from a client computing device 12(1) and a hardware security server 16(1).

The network traffic manager apparatus 14 assists with managing the plurality of hardware security servers 16(1)-16(n) as illustrated and described by way of the examples herein, although the network traffic manager apparatus 14 may perform other types and/or numbers of functions. The processors 18 within the network traffic manager apparatus 14 may execute one or more computer-executable instructions stored in memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
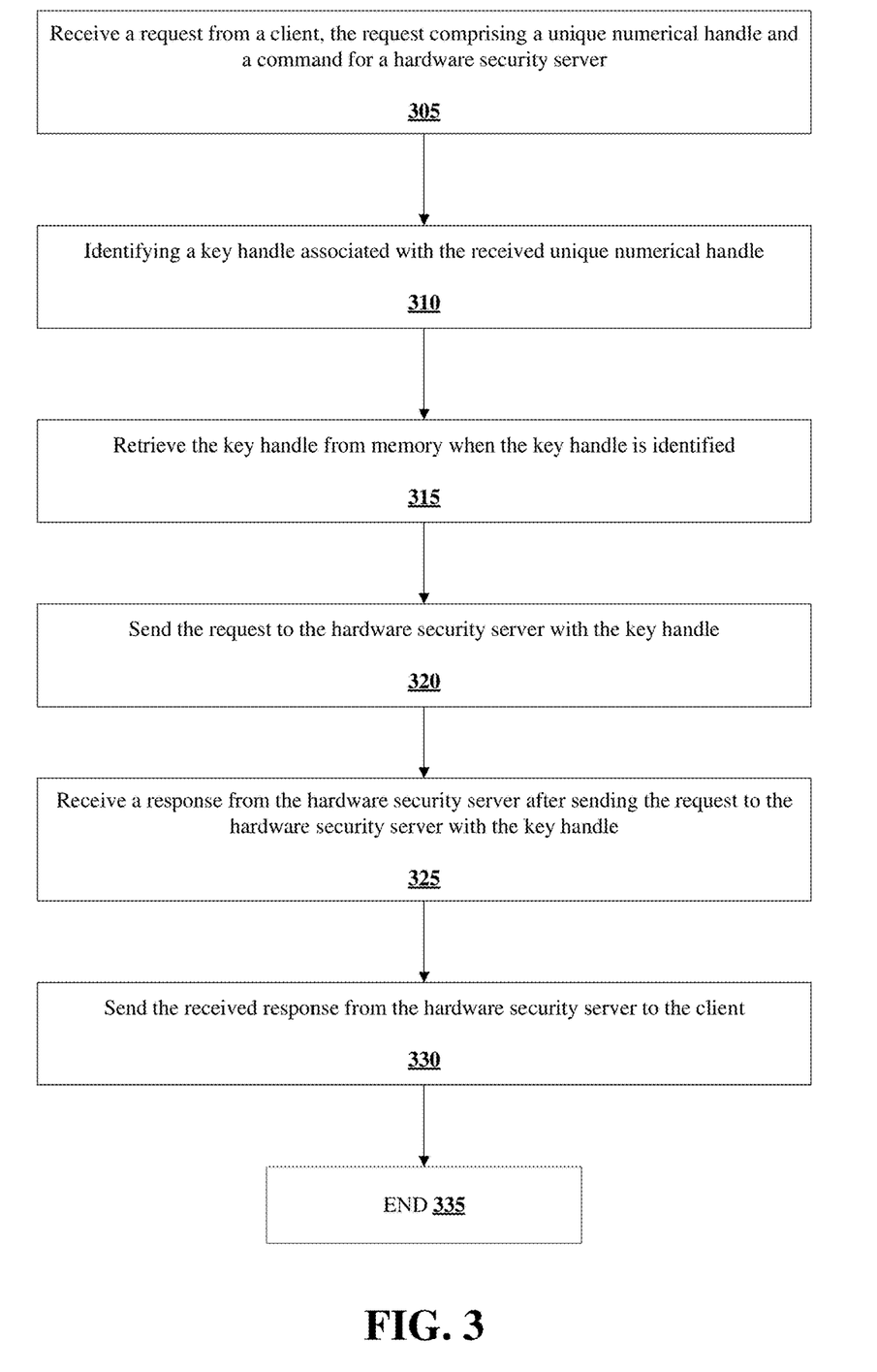
FIG. 3 is a flowchart of an exemplary method for managing hardware security servers.
Figure 4:
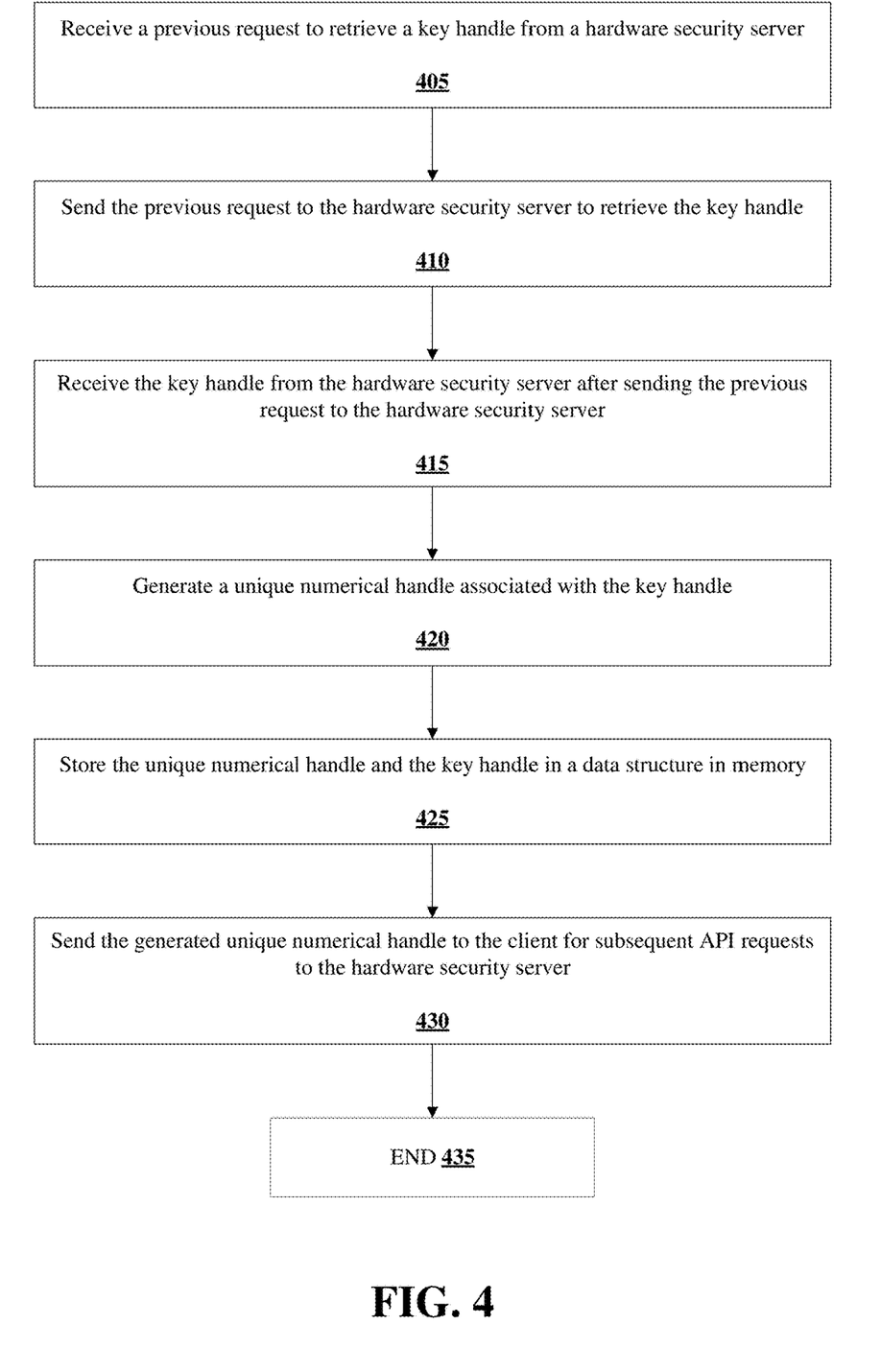
FIG. 4 is a flowchart of an exemplary method for managing hardware security servers.
Figure 5:
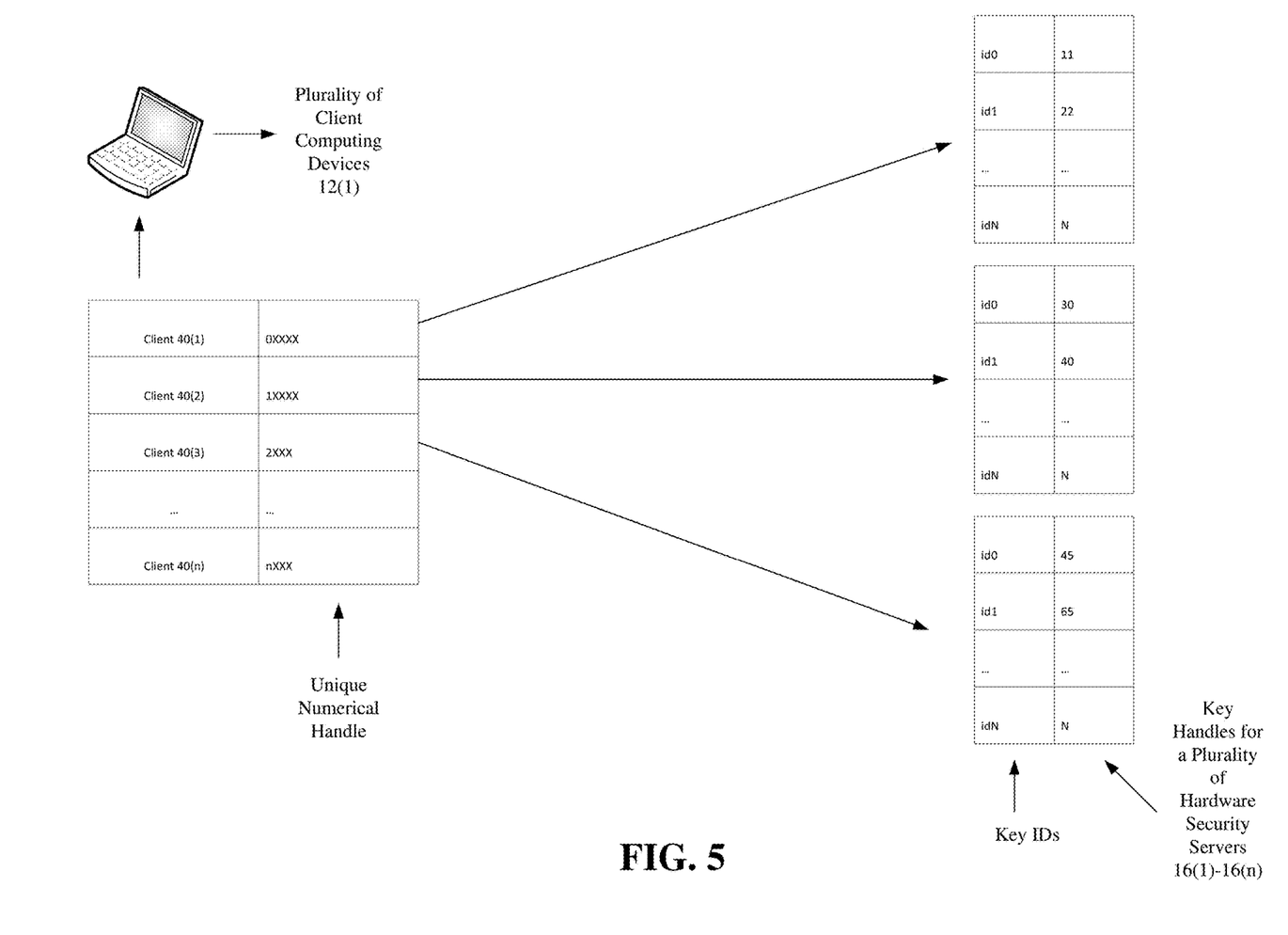
FIG. 5 is a diagram illustrating the method for managing hardware security servers using data structures.

The memory 20 within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowchart shown in FIGS. 3 and 4 are representative of example steps or actions of this technology that may be embodied or expressed as one or more non-transitory computer or machine readable instructions stored in the memory 20 that may be executed by the processor 18 and/or may be implemented by configured logic. The memory 20 can also include structured and/or unstructured data (e.g., HSM management data structure(s) as illustrated in FIG. 5) that is used by the software routines to perform computing tasks. As illustrated in FIG. 5, the data structures can be used to map unique numerical handles and key handles. The key handles can further be mapped to a plurality of hardware security servers 16(1)-16(n).

Accordingly, the memory 20 of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIGS. 3 and 4. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various embodiments, virtual machine(s) running on the network traffic manager apparatus 14 may be managed or supervised by a hypervisor. Additionally, one or more of the components that together comprise the network traffic manager apparatus 14 can be standalone devices or integrated with one or more other devices or apparatuses, such as with a plurality of servers, for example.

The communication system 24 in the network traffic manager apparatus 14 is used to operatively couple and communicate between the network traffic manager apparatus 14, the plurality of client computing devices 12(1)-12(n), and the network traffic manager apparatus 14 which are all coupled together by communication network 30. By way of example only, the communication network can be the internet or another public network.

Each of the plurality of client computing devices 12(1)-12(n) of the network traffic management system 10, include a central processing unit (CPU) or processor, a memory, input/display device interface, configurable logic device and an input/output system or I/O system, which are coupled together by a bus or other link. Additionally, the plurality of client computing devices 12(1)-12(n) can include any type of computing device that can receive, render, and facilitate user interaction, such as client computers, network computer, mobile computers, mobile phones, virtual machines (including cloud-based computer), or the like. Each of the plurality of client computing devices 12(1)-12(n) utilizes the network traffic manager apparatus 14 to conduct one or more operations with the network traffic manager apparatus 14, such as communicating with the plurality of hardware security server(s) 16(1)-16(n) via a communication network 30 between the network traffic manager apparatus 14 and the plurality of hardware security server(s) 16(1)-16(n), by way of example only, although other functions could also be performed as well.

The network traffic manager apparatus 14 can receive requests that are transmitted by the plurality of client computing devices 12(1)-12(n) using a communication network 30. The network traffic manager apparatus 14 can perform various services to map key table(s) between the network traffic manager apparatus 14 and the plurality of hardware security server(s) 16(1)-16(n). The plurality of hardware security server(s) 16(1)-16(n) can perform operations such as load balancing, rate monitoring, caching, encryption/decryption, session management (including key generation), address translation, and/or access control, for example. The network traffic manager apparatus 14 can process the requests and perform various operations on behalf of the plurality of client computing devices 12(1)-12(n). The network traffic manager apparatus 14 can perform various cryptographic and communication operations to communicate with the plurality of hardware security server(s) 16(1)-16(n).

Generally, the plurality of hardware security server(s) 16(1)-16(n) can perform various computing tasks that are implemented using a computing environment. The computing environment can include computer hardware, computer software, and combinations thereof. As a specific example, the computing environment can include general-purpose and/or special-purpose processor(s), configurable and/or hard-wired electronic circuitry, a communications interface, and computer-readable memory for storing computer-executable instructions to enable the processor(s) to perform a given computing task. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations. Additionally, the network traffic manager apparatus 14 can include a cryptographic offload module that is used to offload cryptographic operations to the plurality of hardware security server(s) 16(1)-16(n).

The plurality of hardware security server(s) 16(1)-16(n) can be implemented using various different computer architectures. For example, a plurality of hardware security server(s) 16(1)-16(n) can be implemented as a plug-in circuit card that interfaces to an input/output or peripheral interface (such as Peripheral Component Interconnect Express (PCIe)) of a computer and can include a connector for connecting to a backplane or other connector of the computer. As another example, a plurality of hardware security server(s) 16(1)-16(n) can be implemented as a computer appliance that is connected over a computer network (a network-based plurality of hardware security server(s) 16(1)-16(n)). As another example, a plurality of hardware security server(s) 16(1)-16(n) can be implemented as a virtualized resource within a cloud-computing infrastructure (a cloud-based plurality of hardware security server(s) 16(1)-16(n)). The plurality of hardware security server(s) 16(1)-16(n) can have different storage capacities and/or acceleration capabilities. For example, a physical plurality of hardware security server(s) 16(1)-16(n) can be divided into multiple logical plurality of hardware security server(s) 16(1)-16(n), where each logical plurality of hardware security server(s) 16(1)-16(n) can have different capabilities and can be accessed using different account credentials. A logical plurality of hardware security server(s) 16(1)-16(n) can also be referred to as a partition or token of the physical plurality of hardware security server(s) 16(1)-16(n). Partitions of the plurality of hardware security server(s) 16(1)-16(n) can be isolated from each other so that keys and data on one partition are not visible from a different partition. Partitions can share hardware and other resources or the partitions can use specific unshared hardware and resources. A plurality of hardware security server(s) 16(1)-16(n) can use various storage technologies, such as random-access memory (RAM), non-volatile RAM, FLASH memory, a hard-disk drive, a solid-state drive, or other storage implementations.

The plurality of hardware security servers 16(1)-16(n) can include a plurality of hardware security modules. The plurality of hardware security servers 16(1)-16(n) can be computer hardware and/or software (e.g., a computing device) configured to store cryptographic keys, perform cryptographic operations (such as generating keys, encrypting data, and decrypting data), and enforce a security policy for using and/or accessing the cryptographic keys. The plurality of hardware security servers 16(1)-16(n) can include a physical enclosure that reduces a likelihood of observing and/or tampering with sensitive data, such as private keys of the plurality of hardware security servers 16(1)-16(n). The enclosure can cover potential electrical probe points and display visible damage if the enclosure is tampered with. The plurality of hardware security servers 16(1)-16(n) can have different APIs with different functions that perform the same task. The plurality of hardware security servers 16(1)-16(n) can also adhere to Public Key Cryptography Standards (PKCS). PKCS can be a class of public-key cryptography standards. PKCS #11 (also referred to as Cryptoki) can be a specific platform-independent API for interfacing to the plurality of hardware security servers 16(1)-16(n), which can define data types, functions, and other components that are available to applications that implement the PKCS #11 standard. The data types can represent an item, such as a cryptographic key, that is stored on the plurality of hardware security servers 16(1)-16(n). In some examples, the specific platform-independent API can implement different methods and functions of importing, exporting, encrypting, and decrypting the cryptographic keys. The plurality of hardware security servers 16(1)-16(n) can perform cryptographic and other operations using keys. Specifically, the plurality of hardware security servers 16(1)-16(n) can receive requests associated with an active HSM session. The requests can include requests to retrieve the key handle, requests to initialize or update a persistent attribute, and requests to perform a cryptographic operation. As one example, the key handle can be returned in response to a request for the handle using a persistent attribute (e.g., the key string identifier) as a reference.

In one example, the network traffic manager apparatus 14 can be a dedicated computing device including a processor 18 and a computer-readable memory 20. The memory 20 of the network traffic management apparatus 14 can store one or more applications that can include computer-executable instructions that, when executed by the network traffic manager apparatus 14, cause the network traffic manager apparatus 14 to perform actions, such as to transmit, receive, or otherwise process messages, for example, and to perform other actions such as, offloading cryptographic operations to the plurality of hardware security server(s) 16(1)-16(n) and accessing cryptographic keys stored on the plurality of hardware security server(s) 16(1)-16(n). The application(s) can be implemented as components of other applications. Further, the application(s) can be implemented as operating system extensions, plugins, or the like.

Thus, the technology disclosed herein is not to be construed as being limited to a single environment and other configurations and architectures are also envisaged. For example, the plurality of hardware security server(s) 16(1)-16(n) depicted in FIGS. 1 and 2 can operate within network traffic manager apparatus 14 rather than as a stand-alone server communicating with network traffic manager apparatus 14 via the communication network(s) 30. In this example the plurality of hardware security server(s) 16(1)-16(n) operate within the memory 20 of the network traffic manager apparatus 14.

While the network traffic manager apparatus 14 is illustrated in this example as including a single device, the network traffic manager apparatus 14 in other examples can include a plurality of devices or blades each with processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, plurality of hardware security servers 16(1)-16(n) or, the network traffic manager apparatus 14, or the network traffic manager apparatus 14, or applications coupled to the communication network(s), for example. Moreover, one or more of the devices of the network traffic manager apparatus 14 in these examples can be in a same or a different communication network 30 including one or more public, private, or cloud networks, for example.

Although an exemplary network traffic management system 10 with the plurality of client computing devices 12(1)-12(n), the network traffic manager apparatus 14, and the plurality of hardware security server(s) 16(1)-16(n), and communication networks 30 are described and illustrated herein, it is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the network traffic manager apparatus 14, the plurality of client computing devices 12(1)-12(n), the network traffic manager apparatus 14, and the plurality of hardware security server(s) 16(1)-16(n), for example, may be configured to operate as virtual instances on the same physical machine. In other words, one or more of network traffic manager apparatus 14, the plurality of client computing devices 12(1)-12(n), the network traffic manager apparatus 14, or the plurality of hardware security server(s) 16(1)-16(n) illustrated in FIGS. 1 and 2 may operate on the same physical device rather than as separate devices communicating through a network as depicted in FIG. 1. There may be more or fewer plurality of client computing devices 12(1)-12(n), network traffic manager apparatus 14, the network traffic manager apparatus 14, or the plurality of hardware security server(s) 16(1)-16(n) than depicted in FIGS. 1 and 2. The plurality of client computing devices 12(1)-12(n), the network traffic manager apparatus 14, the plurality of hardware security servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for providing a network traffic manager apparatus 14 will now be described with reference to FIGS. 1-5. First in step 305, the network traffic manager apparatus 14 receives a request from a client computing device 12(1). The request can comprise a unique numerical handle and a command for a hardware security server 16(1). The unique numerical handle can be generated as a response to a previous request from a client as illustrated in FIG. 4. The command for the hardware security server 16(1) can be an API call. An API is a programmatic interface (e.g., a set of methods and/or protocols) for communicating among different modules. In some examples, the network traffic manager apparatus 14 can act as a hardware security server proxy to communicate with a plurality of hardware security servers 16(1)-16(n) to send API calls and receive responses. A proxy is an agent can be situated in a path of communication between a client (e.g., the plurality of client computing devices 12(1)-12(n)) and a server (e.g., the plurality of hardware security servers 16(1)-16(n)) that can intercept communications (e.g., network packets, frames, datagrams, and messages) between the plurality of client computing devices 12(1)-12(n) and the plurality of hardware security servers 16(1)-16(n). The network traffic manager apparatus 14 can function as a virtual server that presents a network address of the network traffic manager apparatus 14 as the network address for the plurality of hardware security servers 16(1)-16(n). By way of example, connecting the plurality of client computing devices 12(1)-12(n) and the network traffic manager apparatus 14 can be completed by integrating a proxy library to the plurality of client computing devices 12(1)-12(n). The proxy library may or may not speak an open protocol to the hardware security server proxy. An endpoint with unified RESTful interface using KMIP or proprietary protocols can connect to the network traffic manager apparatus 14 and the plurality of client computing devices 12(1)-12(n). In some examples, the network traffic manager apparatus 14 can perform security and/or routing functions of the plurality of client computing devices 12(1)-12(n), such as performing encryption and/or decryption operations for traffic flowing between the plurality of client computing devices 12(1)-12(n) and the plurality of hardware security servers 16(1)-16(n). Specifically, the network traffic manager apparatus 14 can act on behalf of the plurality of hardware security servers 16(1)-16(n), such as by encrypting traffic sent by the plurality of hardware security servers 16(1)-16(n), decrypting traffic that is destined for the plurality of hardware security servers 16(1)-16(n), and performing operations of a handshake for exchanging cryptographic information with the plurality of client computing devices 12(1)-12(n).

In step 310, the network traffic manager apparatus 14 identifying a key handle associated with the received unique numerical handle. The hardware security server 16(1) associated with the identified key handle can be configured to execute the received command using the key handle. There can also be a mapping between the received unique numerical handle and the key handle. In some embodiments, there can be multiple key handles for the plurality of hardware security servers 16(1)-16(n) that can be associated to the unique numerical handle as illustrated in FIG. 5. A unique numerical handle can be sent to the plurality of client computing devices 12(1)-12(n). The unique numerical handles can be mapped to a data structure of key handles for a plurality of hardware security servers 16(1)-16(n). The unique numerical handles can be generated as a response to the previous request from the client as illustrated in FIG. 4 and explained below. The unique numerical handle is unique in that it is a specific handle and is unique to the client. However, the unique numerical handle may map to multiple handles retrieved from the plurality of hardware security servers 16(1)-16(n), which may result in the unique numerical handle already matching an already generated handle. While the unique numerical handle may match already generated handles, the numerical handle can have other unique features, as highlighted above and throughout this application. The data structure and mapping can be stored in memory as a response to the previous request from the client as well. In some examples, keys can be generated by the plurality of hardware security servers 16(1)-16(n) and/or requested to be stored on the plurality of hardware security servers 16(1)-16(n). The keys can potentially be kept more secure by storing the keys on the plurality of hardware security servers 16(1)-16(n). Volatile attributes of the key can include the key handle(s). A given key handle is valid as an identifier of the key for a given session. A given key can have multiple key handles, where a different key handle can be used by each session that accesses the key.

In step 315, the network traffic manager apparatus 14 retrieve the key handle from when the key handle is identified in the memory in step 310. By retrieving the key handle from memory, the network traffic manager apparatus 14 can manage the plurality of key handles with correspond to the plurality of hardware security servers 16(1)-16(n). This can enable the plurality of client computing devices 12(1)-12(n) to interface to different servers of the plurality of hardware security servers 16(1)-16(n) with a single interface through the network traffic manager apparatus 14 while masking underlying implementation details of the plurality of hardware security servers 16(1)-16(n). As illustrated in FIG. 5, the plurality of client computing devices 12(1)-12(n) can each have one unique numerical handle. Each unique numerical handle can be mapped to a data structure of key handles for a plurality of hardware security servers 16(1)-16(n). The request received from the client 12(1) is to be sent to a hardware security server 16(1). Using the information of which hardware security server 16(1) the request is to be sent to and the unique numerical handle, the corresponding key handle can be located in the appropriate data structure. It is understood in the art that the key handles and unique numerical handles can be stored in memory in other configurations. By example, in the backend, one numerical handle data structure can exist for each of the plurality of hardware security servers 16(1)-16(n). By example, this mapping can allow a frontend of the plurality of client computing devices 12(1)-12(n) to use the same key across the plurality of hardware security servers 16(1)-16(n). This implementation can permit other advantages for example, a reseller or brokerage application through the plurality of client computing devices 12(1)-12(n) can create an arbitrage proxy that presents pricing to the plurality of client computing devices 12(1)-12(n) using the information of pricing mapped from the backend plurality of hardware security servers 16(1)-16(n) to act as a reseller. For example, the network traffic manager apparatus 14 can send a request to the hardware security server 16(1) for pricing information. The network traffic manager apparatus 14 can receive the pricing information from the hardware security server 16(1). Then, the network traffic manager apparatus can send the received pricing information to the client 12(1). This process can be repeated for the plurality of hardware security servers 16(1)-16(n) to present pricing options to the client 12(1). In some embodiments, the network traffic manager apparatus 14 can also receiving pricing requirements from the client computing devices 12(1)-12(n) prior to sending pricing information received from the plurality of hardware security servers 16(1)-16(n).

In step 320, the network traffic manager apparatus 14 send the received request to the hardware security server 16(1) associated with the identified key handle to execute the command and receive a response after execution of the command. In some embodiments, the received request can be an API request. By example, the network traffic manager apparatus 14 can transmit information using packet-based messages (e.g., Ethernet-based packet data networks) and/or other APIs to the hardware security server 16(1). An API is a programmatic interface (e.g., a set of methods and/or protocols) for communicating. It is known to those skilled in the art that there are other types of requests that can be received from the client and sent to the plurality of hardware security servers 16(1)-16(n). The proxy library integrated in the client computing devices 12(1)-12(n) can allow the network traffic manager apparatus 14 to receive the API Requests from the client computing devices 12(1), to later be sent to the hardware security server 16(1). The proxy library can take the received API request and send the request in an equivalent format or syntax to the hardware security server 16(1) to be processed.

In step 325, the network traffic manager apparatus 14 can receive a response from the hardware security server 16(1) after sending the request with the key handle. In some embodiments, the response can be the output from the hardware security server 16(1) as a result of the API call. In step 330, the network traffic manager apparatus 14 can send the returned response received from the hardware security server 16(1) to the client 12(1) associated with the unique numerical handle and the exemplary flow ends at step 335. By allowing the client computing device 12(1) to send a request in step 305 and later receive the response in step 330, the front end communication calls with the client are streamlined while the network traffic manager apparatus 14 manages the requests to the back end with the plurality of hardware security servers 16(1)-16(n). This allows for a single API key management system on the front end of the plurality of client computing devices 12(1)-12(n), while on the backend allowing access to any number of actual implementations in cloud environment or hardware based on high availability requirements, and other factors.

In addition, an example of how the network traffic manager apparatus 14 processes the previous request to store and generate data structures to manage the key handles and unique numerical handles will now be described with reference to FIG. 4. First in step 405, the network traffic manager apparatus 14 receives a previous request to retrieve a key handle from the hardware security server 16(1). As outlined above and illustrated in FIG. 4, in step 410, the network traffic manager apparatus 14 then sends the previous request to the hardware security server 16(1) to retrieve the key handle. The network traffic manager apparatus 14 can query the hardware security server 16(1) for the volatile key handle using a persistent attribute of a key as a reference for the key. The hardware security server 16(1) can be queried by sending a query to the hardware security server 16(1).

In step 415, the network traffic manager apparatus 14 receives the key handle from the hardware security server after sending the previous request to the hardware security server. A handle is an identifier or reference to a resource or object. For example, a handle can be an integer that is assigned by the plurality of hardware security servers 16(1)-16(n), an operating system, or other software when an object is created or first used. The handle for an object on the plurality of hardware security servers 16(1)-16(n) can be volatile because the handle for the object can change during the lifetime of the object. In contrast, a persistent attribute of an object, once initialized, does not change for the lifetime of the object. Additionally, a key handle can be different for the same key in different sessions. For the same session, the key handle can change when the session is re-established. For some functions performed by the plurality of hardware security servers 16(1)-16(n), the key handle may be the only way to reference the key when performing the function.

In step 420, the network traffic manager apparatus 14 generates a unique numerical handle associated with the key handle. The unique numerical handle can be a random number or series of characters. In some embodiments, the unique numerical handle can be a random or pseudo-random number, and so forth. The unique numerical handle is unique to the client 12(1). In some embodiments, if the network traffic manager apparatus 14 receives requests from a plurality of clients, each client can be sent and assigned a unique numerical handle for future API calls. The unique numerical handle allows the client 12(1) to only manage one handle, while the network traffic manager apparatus 14 manages the key handles for the plurality of hardware security servers 16(1)-16(n) in the backend as outlined above.

In step 425, the network traffic manager apparatus 14 stores the unique numerical handle and the key handle in a data structure in memory. Key handles can be stored in a data structure and the data structure can be updated when the key handle changes so that the additional query can potentially be eliminated for most operations performed by the plurality of hardware security servers 16(1)-16(n). As outlined above, by storing both the unique numerical handle and associating the unique numerical handle to the key handle in the memory, this can allow the network traffic manager apparatus 14 to retrieve the key handle in the future for subsequent operations. A key string identifier can also be stored in the key table to be used to automatically recover the key handle when a session is re-created in order to ensure the correctness of the key handle in the key table, as illustrated in FIG. 5. Additional information can be mapped in the data structures to facilitate operations between the network traffic manager apparatus 14 and the plurality of hardware security servers 16(1)-16(n).

In step 430, the network traffic manager apparatus 14 sends the generated unique numerical handle to the client 12(1) for subsequent API requests to the hardware security server 16(1). By sending the generated unique numerical handle to the client instead of the key handle, the network traffic manager apparatus 14 can connect to the plurality of hardware security servers 16(1)-16(n) simultaneously using the mapping, and can instantly switch to any of the plurality of hardware security servers 16(1)-16(n) for any requested key operation, while the client 12(1) only needs to the unique numerical handle for future requests. The network traffic manager apparatus 14 can also reconfigure the numerical handle data structures when one of the plurality of hardware security servers 16(1)-16(n) is updated without changing the unique numerical handle. The network traffic manager apparatus 14 can also automatically update the plurality of client computing devices 12(1)-12(n) if needed without affecting the unique numerical handle sent to the client.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for managing hardware security servers, the method implemented by a network traffic management system or a cloud service comprising network traffic apparatuses, client devices, or server devices, the method comprising:
   receiving a request from a client, wherein the request comprises a unique numerical handle and a command for a hardware security server, and wherein the unique numerical handle was generated as a response to a previous request from the client;
   identifying one of a plurality of key handles that is associated with the received unique numerical handle, wherein the hardware security server associated with the identified key handle is configured to execute the received command, wherein the received unique numerical handle is mapped to the identified key handle in a data structure in memory, wherein the received unique numerical handle is mapped to other ones of the key handles in the data structure, and wherein each of the other ones of the key handles is associated with a corresponding one of a plurality of hardware security servers;
   sending the received request to the hardware security server associated with the identified key handle to execute the command and return a response after execution of the command; and
   sending the returned response received from the hardware security server to the client associated with the unique numerical handle.

2. The method as set forth in claim 1 further comprising:
   receiving the previous request from the client, wherein the previous request is an API request to retrieve the key handle from the hardware security server;
   sending the previous request to the hardware security server to retrieve the key handle, wherein the key handle is generated by the hardware security server;
   storing the unique numerical handle and the key handle in a data structure in a memory, wherein the unique numerical handle is generated and associated with the key handle, and wherein the key handle is received from the hardware security server after sending the previous request to the hardware security server; and
   sending the generated unique numerical handle to the client, wherein the generated unique numerical handle is sent for subsequent API requests to the hardware security server.

3. The method as set forth in claim 2 further comprising:
   receiving a subsequent request from the client, wherein the subsequent request comprises the unique numerical handle, and wherein the unique numerical handle was generated as a response to the previous request from the client;
   sending the subsequent request to a different hardware security server with a different key handle, wherein the different key handle is retrieved from the memory by searching for the different key handle associated with the different hardware security server using the unique numerical handle; and
   sending a subsequent response to the client, wherein the subsequent response is received from the different hardware security server as a result of sending the subsequent request to the different hardware security server with the different key handle.

4. The method as set forth in claim 1, further comprising:
   receiving a new key handle from the hardware security server as a response to sending the request to the hardware security server and as a result of the hardware security server being reconfigured; and
   storing the new key handle associated to the unique numerical handle in the memory, wherein the new key handle from the reconfigured hardware security server replaces the key handle in the memory.

5. A non-transitory computer readable medium having stored thereon instructions for managing hardware security servers comprising executable code which when executed by processors, causes the processors to:
   receive a request from a client, wherein the request comprises a unique numerical handle and a command for a hardware security server, and wherein the unique numerical handle was generated as a response to a previous request from the client;
   identify one of a plurality of key handles that is associated with the received unique numerical handle, wherein the hardware security server associated with the identified key handle is configured to execute the received command, wherein the received unique numerical handle is mapped to the identified key handle in a data structure in memory, wherein the received unique numerical handle is mapped to other ones of the key handles in the data structure, and wherein each of the other ones of the key handles is associated with a corresponding one of a plurality of hardware security servers;
   send the received request to the hardware security server associated with the identified key handle to execute the command and return a response after execution of the command; and
   send the returned response received from the hardware security server to the client associated with the unique numerical handle.

6. The medium as set forth in claim 5, wherein the executable code which when executed by the processors, further causes the processors to:
   receive the previous request from the client, wherein the previous request is an API request to retrieve the key handle from the hardware security server;
   send the previous request to the hardware security server to retrieve the key handle, wherein the key handle is generated by the hardware security server;
   store the unique numerical handle and the key handle in a data structure in memory, wherein the unique numerical handle is generated and associated with the key handle, and wherein the key handle is received from the hardware security server after sending the previous request to the hardware security server; and
   send the generated unique numerical handle to the client, wherein the generated unique numerical handle is sent for subsequent API requests to the hardware security server.

7. The medium as set forth in claim 6, wherein the executable code which when executed by the processors, further causes the processors to:
   receive a subsequent request from the client, wherein the subsequent request comprises the unique numerical handle, and wherein the unique numerical handle was generated as a response to the previous request from the client;
   send the subsequent request to a different hardware security server with a different key handle, wherein the different key handle is retrieved from the memory by searching for the different key handle associated with the different hardware security server using the unique numerical handle; and send a subsequent response to the client, wherein the subsequent response is received from the different hardware security server as a result of sending the subsequent request to the different hardware security server with the different key handle.

8. The medium as set forth in claim 5, wherein the executable code which when executed by the processors, further causes the processors to:

receive a new key handle from the hardware security server as a response to sending the request to the hardware security server and as a result of the hardware security server being reconfigured; and store the new key handle associated to the unique numerical handle in memory, wherein the new key handle from the reconfigured hardware security server replaces the key handle in the memory.

9. A network traffic manager apparatus, comprising memory comprising programmed instructions stored in the memory and processors configured to be capable of executing the programmed instructions stored in the memory to:

receive a request from a client, wherein the request comprises a unique numerical handle and a command for a hardware security server, and wherein the unique numerical handle was generated as a response to a previous request from the client;

identify one of a plurality of key handles that is associated with the received unique numerical handle, wherein the hardware security server associated with the identified key handle is configured to execute the received command, wherein the received unique numerical handle is mapped to the identified key handle in a data structure in memory, wherein the received unique numerical handle is mapped to other ones of the key handles in the data structure, and wherein each of the other ones of the key handles is associated with a corresponding one of a plurality of hardware security servers;

send the received request to the hardware security server associated with the identified key handle to execute the command and return a response after execution of the command; and send the returned response received from the hardware security server to the client associated with the unique numerical handle.

10. The device as set forth in claim 9, wherein the processors are further configured to be capable of executing the programmed instructions stored in the memory to:

receive the previous request from the client, wherein the previous request is an API request to retrieve the key handle from the hardware security server;

send the previous request to the hardware security server to retrieve the key handle, wherein the key handle is generated by the hardware security server;

store the unique numerical handle and the key handle in a data structure in the memory, wherein the unique numerical handle is generated and associated with the key handle, and wherein the key handle is received from the hardware security server after sending the previous request to the hardware security server; and send the generated unique numerical handle to the client, wherein the generated unique numerical handle is sent for subsequent API requests to the hardware security server.

11. The device as set forth in claim 10, wherein the processors are further configured to be capable of executing the programmed instructions stored in the memory to:

receive a subsequent request from the client, wherein the subsequent request comprises the unique numerical handle, and wherein the unique numerical handle was generated as a response to the previous request from the client;

send the subsequent request to a different hardware security server with a different key handle, wherein the different key handle is retrieved from the memory by searching for the different key handle associated with the different hardware security server using the unique numerical handle; and send a subsequent response to the client, wherein the subsequent response is received from the different hardware security server as a result of sending the subsequent request to the different hardware security server with the different key handle.

12. The device as set forth in claim 9, wherein the processors are further configured to be capable of executing the programmed instructions stored in the memory to:

receive a new key handle from the hardware security server as a response to sending the request to the hardware security server and as a result of the hardware security server being reconfigured; and store the new key handle associated to the unique numerical handle in the memory, wherein the new key handle from the reconfigured hardware security server replaces the key handle in the memory.

13. A network traffic management system, comprising traffic management apparatuses, client devices, or server devices, the network traffic management system comprising memory comprising programmed instructions stored thereon and processors configured to be capable of executing the stored programmed instructions to:

receive a request from a client, wherein the request comprises a unique numerical handle and a command for a hardware security server, and wherein the unique numerical handle was generated as a response to a previous request from the client;

identify one of a plurality of key handles that is associated with the received unique numerical handle, wherein the hardware security server associated with the identified key handle is configured to execute the received command, wherein the received unique numerical handle is mapped to the identified key handle in a data structure in memory, wherein the received unique numerical handle is mapped to other ones of the key handles in the data structure, and wherein each of the other ones of the key handles is associated with a corresponding one of a plurality of hardware security servers;

send the received request to the hardware security server associated with the identified key handle to execute the command and return a response after execution of the command; and send the returned response received from the hardware security server to the client associated with the unique numerical handle.

14. The network traffic management system as set forth in claim 13, wherein the processors are further configured to be capable of executing the programmed instructions stored in the memory to:

receive the previous request from the client, wherein the previous request is an API request to retrieve the key handle from the hardware security server;

send the previous request to the hardware security server to retrieve the key handle, wherein the key handle is generated by the hardware security server;

store the unique numerical handle and the key handle in a data structure in the memory, wherein the unique numerical handle is generated and associated with the key handle, and wherein the key handle is received from the hardware security server after sending the previous request to the hardware security server; and send the generated unique numerical handle to the client, wherein the generated unique numerical handle is sent for subsequent API requests to the hardware security server.

15. The network traffic management system as set forth in claim 14, wherein the processors are further configured to be capable of executing the programmed instructions stored in the memory to:

receive a subsequent request from the client, wherein the subsequent request comprises the unique numerical handle, and wherein the unique numerical handle was generated as a response to the previous request from the client;

send the subsequent request to a different hardware security server with a different key handle, wherein the different key handle is retrieved from the memory by searching for the different key handle associated with the different hardware security server using the unique numerical handle; and send a subsequent response to the client, wherein the subsequent response is received from the different hardware security server as a result of sending the subsequent request to the different hardware security server with the different key handle.

16. The network traffic management system as set forth in claim 13, wherein the processors are further configured to be capable of executing the programmed instructions stored in the memory to:

receive a new key handle from the hardware security server as a response to sending the request to the hardware security server and as a result of the hardware security server being reconfigured; and store the new key handle associated to the unique numerical handle in the memory, wherein the new key handle from the reconfigured hardware security server replaces the key handle in the memory.

17. The method as set forth in claim 4, wherein the key handle is an identifier of a key for a given session.

18. The medium as set forth in claim 5, wherein the key handle is an identifier of a key for a given session.

19. The device as set forth in claim 9, wherein the key handle is an identifier of a key for a given session.

20. The network traffic management system as set forth in claim 13, wherein the key handle is an identifier of a key for a given session.

* * * * *